US010693816B2

(12) United States Patent
Guo et al.

(10) Patent No.: US 10,693,816 B2
(45) Date of Patent: Jun. 23, 2020

(54) COMMUNICATION METHODS AND SYSTEMS, ELECTRONIC DEVICES, AND COMPUTER CLUSTERS

(71) Applicant: Beijing SenseTime Technology Development Co., Ltd, Beijing (CN)

(72) Inventors: Yingdi Guo, Beijing (CN); Shengen Yan, Beijing (CN)

(73) Assignee: Beijing SenseTime Technology Development Co., Ltd, Beijing (CN)

( * ) Notice: Subject to any disclaimer, the term of this patent is extended or adjusted under 35 U.S.C. 154(b) by 7 days.

(21) Appl. No.: 16/234,890

(22) Filed: Dec. 28, 2018

(65) Prior Publication Data

US 2019/0140982 A1    May 9, 2019

Related U.S. Application Data

(63) Continuation of application No. PCT/CN2017/108429, filed on Oct. 30, 2017.

(30) Foreign Application Priority Data

Oct. 28, 2016   (CN) .......................... 2016 1 0967290

(51) Int. Cl.
*H04L 12/931*   (2013.01)
*G06F 9/38*   (2018.01)
(Continued)

(52) U.S. Cl.
CPC .......... *H04L 49/358* (2013.01); *G06F 9/3851* (2013.01); *G06F 9/54* (2013.01); *G06F 15/17331* (2013.01); *H04L 67/10* (2013.01)

(58) Field of Classification Search
None
See application file for complete search history.

(56) References Cited

U.S. PATENT DOCUMENTS 8,037,224 B2 * 10/2011 Zhu ........................ G06F 9/3851
710/105
8,543,747 B2 * 9/2013 Zhu ........................ G06F 9/3851
710/105

(Continued)

FOREIGN PATENT DOCUMENTS

| CN | 101409715 | 4/2009 |
|---|---|---|
| CN | 102404212 | 4/2012 |
| CN | 104639596 | 5/2015 |

OTHER PUBLICATIONS

International Search Report, PCT/CN2017/108429, dated Jan. 9, 2018, dated Jan. 18, 2018.

*Primary Examiner* — Davoud A Zand
(74) *Attorney, Agent, or Firm* — Garvey, Smith & Nehrbass, Patent Attorneys, L.L.C.; Seth M. Nehrbass; Fabian M. Nehrbass

(57) ABSTRACT

Embodiments of the present disclosure disclose communication methods and systems, electronic devices, and computer clusters. The method includes: separately creating a corresponding thread for at least one of a plurality of target devices, where the created thread corresponding to the target device includes a communication thread and a message processing thread, and the message processing thread includes a message sending thread and/or a message receiving thread; and communicating with a corresponding target device on the basis of the corresponding created thread.

20 Claims, 5 Drawing Sheets

(51) Int. Cl.
    *G06F 9/54* (2006.01)
    *G06F 15/173* (2006.01)
    *H04L 29/08* (2006.01)

(56) References Cited

U.S. PATENT DOCUMENTS

| | | | |
|---|---|---|---|
| 8,788,732 B2* | 7/2014 | Zhu | G06F 9/3851 |
| | | | 710/105 |
| 9,477,536 B2* | 10/2016 | Falco | G06F 9/541 |
| 2005/0091334 A1* | 4/2005 | Chen | G06F 9/546 |
| | | | 709/216 |
| 2008/0062927 A1* | 3/2008 | Zhu | G06F 9/3851 |
| | | | 370/331 |
| 2010/0318703 A1* | 12/2010 | Zhu | G06F 9/3851 |
| | | | 710/105 |
| 2012/0089762 A1* | 4/2012 | Zhu | G06F 9/3851 |
| | | | 710/305 |
| 2012/0216216 A1 | 8/2012 | Taboada et al. | |
| 2013/0339558 A1* | 12/2013 | Zhu | G06F 9/3851 |
| | | | 710/105 |

\* cited by examiner

COMMUNICATION METHODS AND SYSTEMS, ELECTRONIC DEVICES, AND COMPUTER CLUSTERS

CROSS-REFERENCE TO RELATED DISCLOSURES

The present disclosure is a continuation of International Application No. PCT/CN2017/108429, filed on Oct. 30, 2017, which claims priority to Chinese Patent Disclosure No. 2016010967290.6, filed with the Chinese Patent Office on Oct. 28, 2016, and entitled "COMMUNICATION METHODS AND SYSTEMS, ELECTRONIC DEVICES, AND COMPUTER CLUSTERS." All of the aforementioned disclosures are incorporated herein by reference in its entirety.

TECHNICAL FIELD

The present disclosure relates to the technical field of communications, and in particular, to communication methods and systems for communication with a device, electronic devices, computer clusters, and computer medium.

BACKGROUND

In large-scale training clusters, communication is a module of great importance, especially in large-scale deep learning training tasks, to obtain better model parameters and accelerate model convergence, frequent communication is necessary. Communication is one of the bottlenecks of the training speed. At present, in highly integrated training systems and supercomputing centers, an Infiniband (IB) architecture is commonly used to accelerate communication. In IB, dedicated hardware is employed to simplify protocol stacks, and most of the work in which CPUs are originally required to participate for memory sharing between two computers is directly completed by IB hardware.

SUMMARY

In this regard, embodiments of the present disclosure provide technical solutions for communication with a device.

According to one aspect of the embodiments of the present disclosure, a communication method is provided, including: creating a corresponding thread for at least one of a plurality of target devices, where the created thread corresponding to the target device includes a communication thread and a message processing thread, and the message processing thread includes at least one of a message sending thread or a message receiving thread; and communicating with a corresponding target device on the basis of the corresponding created thread, where a communication process with a first target device includes at least one of: sending, by a first message sending thread, an information sending message to a first communication thread, and sending, by the first communication thread, information to the first target device on the basis of the information sending message by calling an IB interface; or receiving, by the first communication thread by calling the IB interface, information sent by the first target device, generating an information receiving message corresponding to the received information, and sending the information receiving message to a first message receiving thread; where the first target device is one of the plurality of target devices, and the first communication thread, the first message sending thread, and the first message receiving thread are a communication thread, a message sending thread, and a message receiving thread corresponding to the first target device, respectively.

According to one or more embodiments of the present disclosure, the communication process with the first target device further includes at least one of: putting, by the first message sending thread, the information sending message to be sent to the first communication thread in a task pool in response to determining that the first communication thread is currently in a busy state; or putting, by the first communication thread, the information receiving message to be sent to the first message receiving thread in the task pool in response to determining that the first message receiving thread is currently in a busy state; where the task pool is configured to cache at least one of information sending messages or information receiving messages to be processed corresponding to the plurality of target devices.

According to one or more embodiments of the present disclosure, the communication method further includes: taking out, by a pre-created global task processing thread corresponding to the plurality of target devices, the information sending message corresponding to the first target device from the task pool and sending the information sending message to the first communication thread in response to determining that the first communication thread is currently in an idle state; or taking out, by the pre-created global task processing thread corresponding to the plurality of target devices, the information receiving message corresponding to the first target device from the task pool and sending the information receiving message to the first message receiving thread in response to determining that the first message receiving thread is currently in an idle state.

According to one or more embodiments of the present disclosure, the communication process with the first target device further includes at least one of: setting a state identification bit corresponding to the information sending message; the first message sending thread receives feedback information corresponding to the sent information and sent by the first communication thread, and assigns a value to the state identification bit of the information sending message according to the feedback information; or setting a state identification bit corresponding to the information receiving message; the first message receiving thread assigns a value to the state identification bit of the information receiving message according to a processing result of the information receiving message.

According to one or more embodiments of the present disclosure, the communication process with the first target device further includes: taking out, by the global task processing thread in response to the state identification bit of at least one of the information sending message or the information receiving message corresponding to the first target device taken out of the task pool being success, at least one of a next information sending message or a next information receiving message corresponding to the first target device from the task pool on the basis of the order in which the at least one of the information sending message or the information receiving message enters the task pool, and sending the at least one of the next information sending message or the next information receiving message to at least one of the first communication thread or the first message receiving thread.

According to one or more embodiments of the present disclosure, the communication process with the first target device further includes: determining, in response to the received information including a check code and a control command, a new check code according to the control command receiving progress of a memory block used for storing the control command, performing verification comparison on the new check code and the received check code, and determining that reception of the information from the first target device is completed when the verification succeeds.

According to one or more embodiments of the present disclosure, the communication process with the first target device further includes: performing data invalidation processing on the received check code in response to determining that reception of the information from the first target device is completed.

According to one or more embodiments of the present disclosure, the creating a corresponding thread for the first target device includes at least one of: creating the first message sending thread in response to determining that the current information sending is the first information sending to the first target device; creating the first communication thread in response to determining that the first communication thread corresponding to the first target device is not created currently; or creating the first message receiving thread in response to determining that the current information reception is the first reception of information sent by the first target device.

According to one or more embodiments of the present disclosure, the communication method further includes, if an operation exception event is received by means of the IB interface, calling back, by the first communication thread, an exception processing function corresponding to the exception event in response to determining that the exception processing function is registered.

According to one or more embodiments of the present disclosure, the IB interface includes an IB VERBS interface.

According to another aspect of the present disclosure, a communication system is provided, including: a thread configuration module, configured to create a corresponding thread for at least one of a plurality of target devices, where the created thread corresponding to the target device includes a communication thread and a message processing thread, and the message processing thread includes at least one of a message sending thread or a message receiving thread; and a data communication module, configured to communicate with a corresponding target device on the basis of the corresponding created thread; where a first message sending thread sends an information sending message to a first communication thread, and the first communication thread sends information to a first target device on the basis of the information sending message by calling an IB interface; or the first communication thread receives, by calling the IB interface, information sent by the first target device, generates an information receiving message corresponding to the received information, and sends the information receiving message to a first message receiving thread; where the first target device is one of the plurality of target devices, and the first communication thread, the first message sending thread, and the first message receiving thread are a communication thread, a message sending thread, and a message receiving thread corresponding to the first target device, respectively.

According to one or more embodiments of the present disclosure, the first message sending thread puts the information sending message to be sent to the first communication thread in a task pool in response to determining that the first communication thread is currently in a busy state; and/or the first communication thread puts the information receiving message to be sent to the first message receiving thread in the task pool in response to determining that the first message receiving thread is currently in a busy state; where the task pool is configured to cache at least one of information sending messages or information receiving messages to be processed corresponding to the plurality of target devices.

According to one or more embodiments of the present disclosure, the thread configuration module is further configured to create a global task processing thread corresponding to the plurality of target devices; where the global task processing thread takes out the information sending message corresponding to the first target device from the task pool and sends the information sending message to the first communication thread in response to determining that the first communication thread is currently in an idle state; and/or the global task processing thread takes out the information receiving message corresponding to the first target device from the task pool and sends the information receiving message to the first message receiving thread in response to determining that the first message receiving thread is currently in an idle state.

According to one or more embodiments of the present disclosure, the system further includes: a processing state setting module, configured to set a state identification bit corresponding to the information sending message, and/or set a state identification bit corresponding to the information receiving message; where the first message sending thread receives feedback information corresponding to the sent information and sent by the first communication thread, and assigns a value to the state identification bit of the information sending message according to the feedback information; or the first message receiving thread assigns a value to the state identification bit of the information receiving message according to a processing result of the information receiving message.

According to one or more embodiments of the present disclosure, the global task processing thread takes out, in response to the state identification bit of at least one of the information sending message or the information receiving message corresponding to the first target device taken out of the task pool being success and on the basis of the order in which the at least one of the information sending message or the information receiving message enters the task pool, at least one of a next information sending message or a next information receiving message corresponding to the first target device from the task pool and sends the at least one of the next information sending message or the next information receiving message to at least one of the first communication thread or the first message receiving thread.

According to one or more embodiments of the present disclosure, the system further includes: an information verification module, configured to determine, in response to the received information including a check code and a control command, a new check code according to the control command receiving progress of a memory block used for storing the control command, perform verification comparison on the new check code and the received check code, and determine that reception of the information from the first target device is completed when the verification succeeds.

According to one or more embodiments of the present disclosure, the information verification module is further configured to perform data invalidation processing on the received check code in response to determining that reception of the information from the first target device is completed.

According to one or more embodiments of the present disclosure, the thread configuration module is further configured to create the first message sending thread in response to determining that the current information sending is the first information sending to the first target device; and/or create the first communication thread in response to determining that the first communication thread corresponding to the first target device is not created currently; and/or create the first message receiving thread in response to determining that the current information reception is the first reception of information sent by the first target device.

According to one or more embodiments of the present disclosure, if an operation exception event is received by means of the IB interface, the first communication thread calls back an exception processing function corresponding to the exception event in response to determining that the exception processing function is registered.

According to one or more embodiments of the present disclosure, the IB interface includes an IB VERBS interface.

According to still another aspect of the present disclosure, an electronic device is provided, including: a processor, a memory, an IB communication part, and a communication bus, where the processor, the memory, and the communication part communicate with one another by means of the communication bus; and the memory is configured to store at least one executable instruction, and the executable instruction causes the processor to execute corresponding operations of the foregoing communication method.

According to one or more embodiments of the present disclosure, the IB communication part includes an IB network card, and the processor communicates with other external electronic devices by means of the communication bus and the IB network card.

According to yet another aspect of the embodiments of the present disclosure, a computer cluster is provided, including a plurality of said electronic devices and switch devices respectively connected to the electronic devices, where any of the electronic devices communicates with the other electronic devices by means of the respective IB communication part and the switch device.

According to yet another aspect of the embodiments of the present disclosure, a computer system is provided, the computer system includes at least one processor; and a memory storing instructions, the instructions when executed by the at least one processor, cause the at least one processor to perform operations of the foregoing communication method.

According to yet another aspect of the embodiments of the present disclosure, a non-transitory computer readable storage medium is provided, the computer medium storing a computer program, where the computer program, when executed by a processor, cause the processor to execute corresponding operations of the foregoing communication method.

According to the communication methods and systems, the electronic devices, the computer clusters and the computer medium provided by the present disclosure, a multi-threading mode is adopted for data sending and reception of a target device. Thus, data transmission speed can be improved and bandwidth can be effectively utilized.

Additional aspects and advantages of the embodiments of the present disclosure will be provided in the following description, and these will become apparent in the following description or may be understood through the practice of the present disclosure.

BRIEF DESCRIPTION OF THE DRAWINGS

The accompanying drawings constituting a part of the specification are used for describing embodiments of the present disclosure and are intended to explain the principles of the present disclosure together with the description.

According to the following detailed description, the present disclosure can be understood more clearly with reference to the accompanying drawings.

Apparently, the accompanying drawings in the following description show merely some embodiments of the present invention, and a person of ordinary skill in the art can still derive other accompanying drawings from these accompanying drawings without creative efforts.

Figure 1:
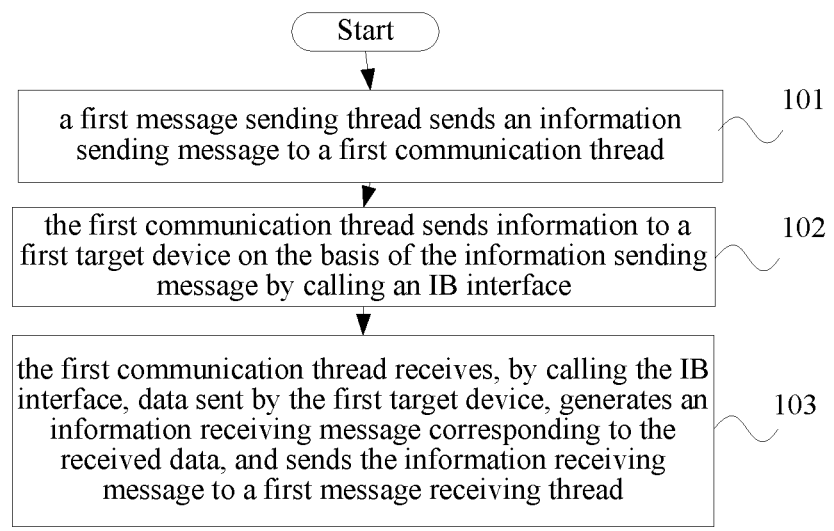
Figure 2:
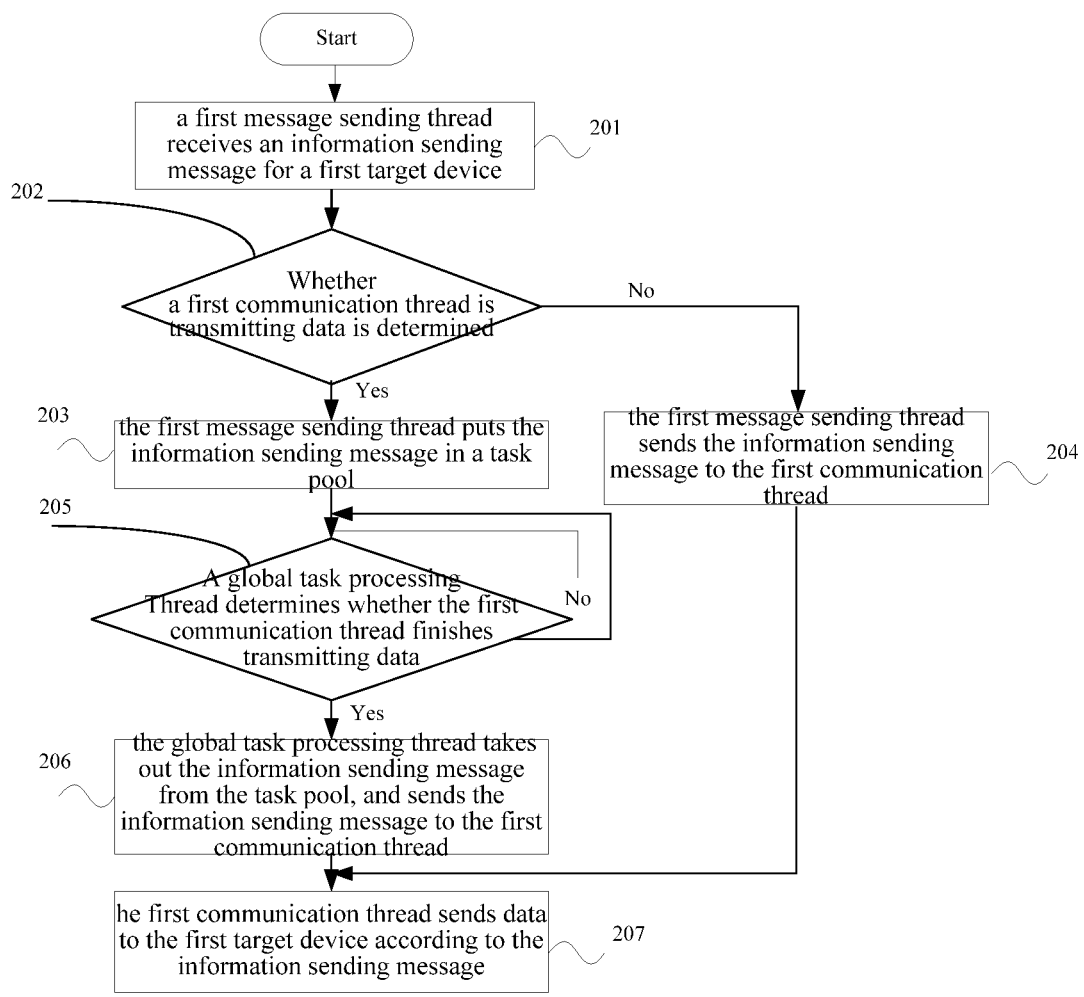
Figure 3:
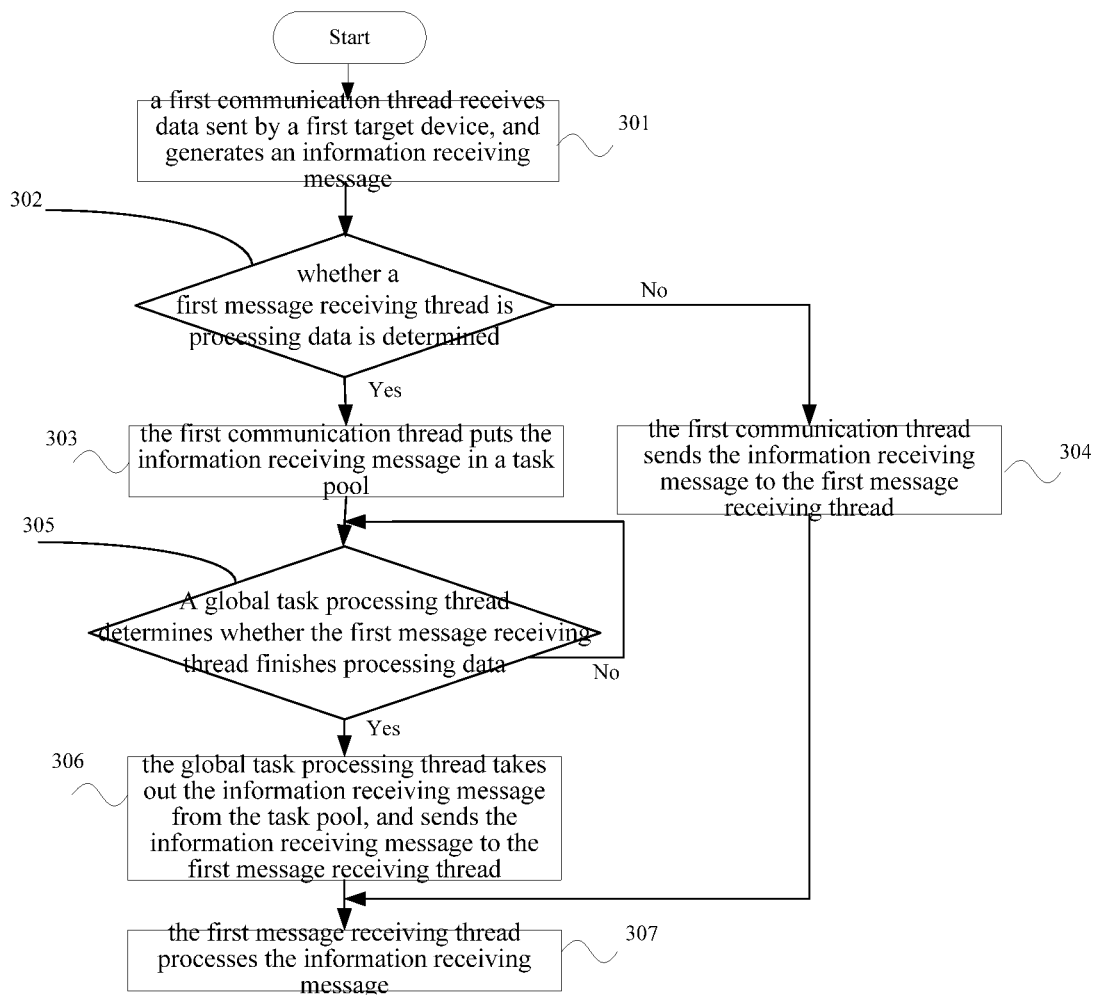
Figure 4:
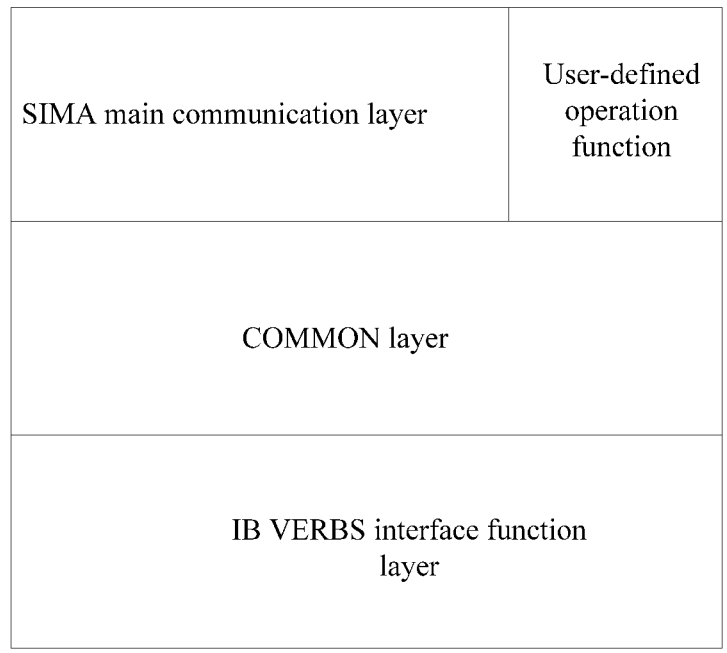
Figure 5:
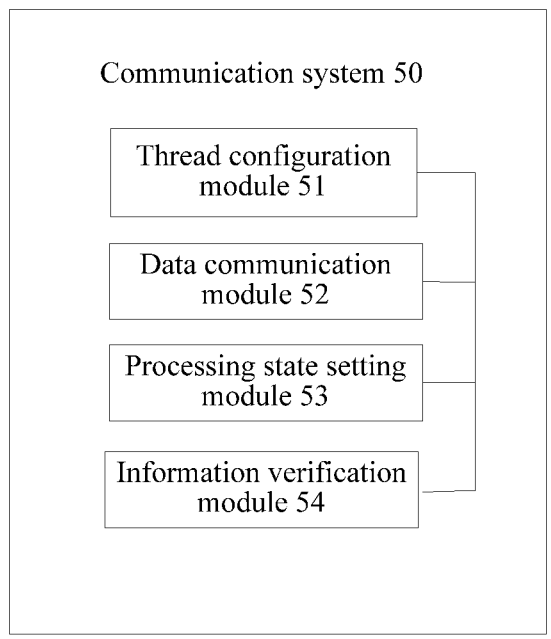
Figure 6:
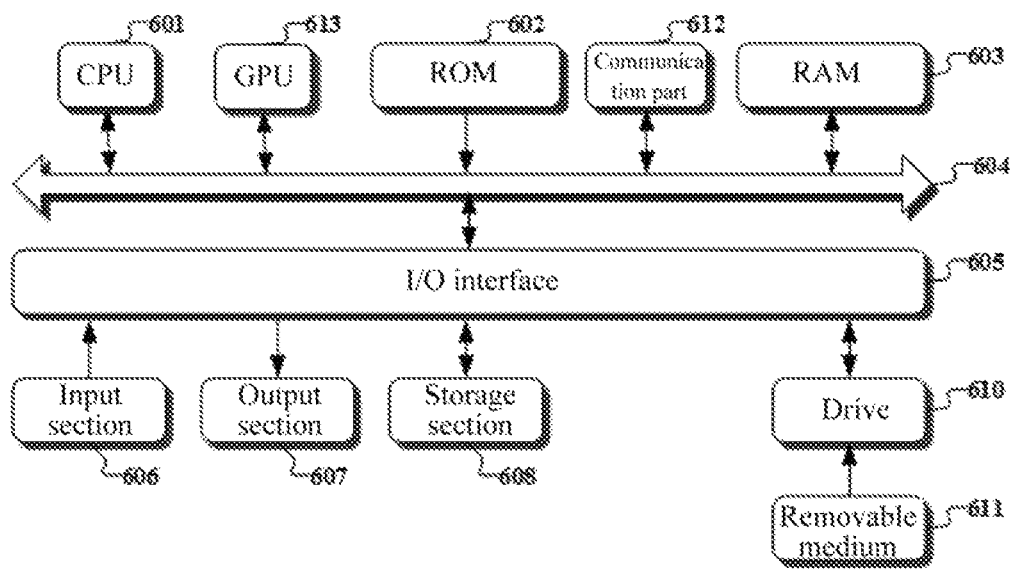
Figure 7:
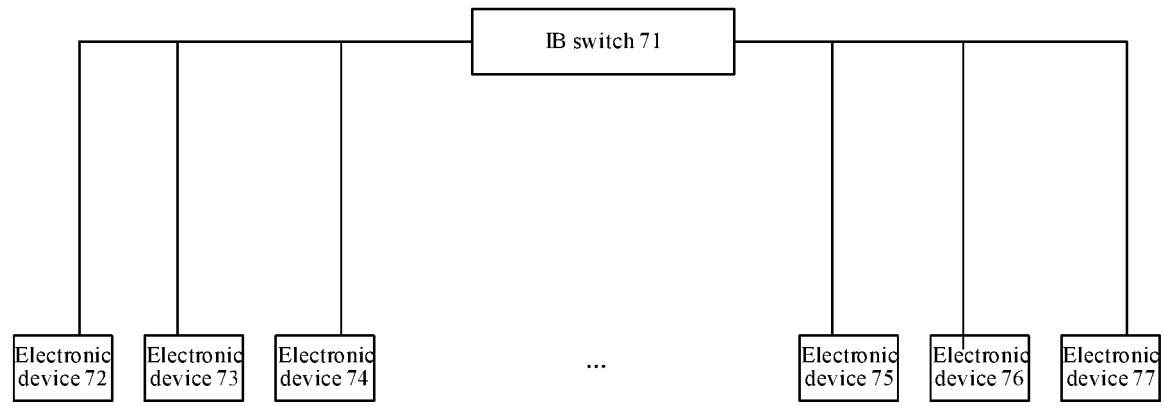

FIG. 1 is a flowchart of an embodiment of the communication method according to the present disclosure;

FIG. 2 is a flowchart for information sending message processing of an embodiment of the communication method according to the present disclosure;

FIG. 3 is a flowchart for information receiving message processing of an embodiment of the communication method according to the present disclosure;

FIG. 4 is a schematic diagram of a hierarchical structure design using the present disclosure;

FIG. 5 is a schematic block diagram of an embodiment of the communication system according to the present disclosure;

FIG. 6 is a schematic diagram of an embodiment of the electronic device according to the present disclosure; and FIG. 7 is a schematic diagram of an embodiment of the computer cluster according to the present disclosure.

DETAILED DESCRIPTION

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, a size of each part shown in the accompanying drawings is not drawn in actual proportion.

The following descriptions of at least one exemplary embodiment are merely illustrative actually, and are not intended to limit the present disclosure and the disclosures or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to computer systems/servers, which may operate with numerous other general-purpose or special-purpose computing system environments or configurations. Examples of well-known computing systems, environments, and/or configurations suitable for use together with the computer system/server include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like, to perform specific tasks or implement specific abstract data types. The computer systems/servers may be practiced in the distributed cloud computing environments in which tasks are executed by remote processing devices that are linked through a communications network. In the distributed cloud computing environments, program modules may be located in local or remote computing system storage media including storage devices.

The "first" in the following text is used for differentiation in description, without special meanings. It should be noted that the expression of "/" in the present disclosure represents the meaning of "or"; the expression of "A and/or B" in the present disclosure represents the meaning of "at least one of A or B".

In the communication methods of the present disclosure, multi-threading technology is adopted for data interaction between a plurality of target devices. The multi-threading technology may be adopted for data sending or reception, and may also be adopted for data sending and reception. A corresponding thread is separately created for at least one of or each of a plurality of target devices, for example, a communication thread and a message processing thread corresponding to any of the target device is created, where the message processing thread includes a message sending thread and a message receiving thread. For example, a first target device is any of the plurality of target devices, and a first communication thread, a first message sending thread, and a first message receiving thread are a communication thread, a message sending thread, and a message receiving thread corresponding to the first target device, respectively.

FIG. 1 is a flowchart according to an embodiment of the communication method. As shown in FIG. 1:

Step 101, a first message sending thread sends an information sending message to a first communication thread, for example, the information sending message may be information about a user purchasing a commodity sent to a target server, etc.

Step 102, the first communication thread sends information to a first target device on the basis of the information sending message by calling an IB interface. Information sent to and received from the target device in the present disclosure includes data and/or control commands.

Step 103, the first communication thread receives, by calling the IB interface, data sent by the first target device, generates an information receiving message corresponding to the received data, and sends the information receiving message to a first message receiving thread.

The first communication thread processes the received information sending message, for example, extracting information of the commodity purchased by the user from the information sending message, generates a data sending instruction according to a preset rule, passes the data sending instruction to the IB interface, and sends the data sending instruction to the target device by calling an IB interface function.

Data can be sent between threads by means of a global variable, a message mechanism, etc. An information sending message may be in various formats, including a message header, a message body, etc. Corresponding information of the target device and information of the message sending thread and the communication thread are encapsulated in the message header, and data needing to be sent is encapsulated in the message body. An information receiving message may also be in various formats, including a message header, a message body, etc. Corresponding information of the target device and information of the message receiving thread and the communication thread are encapsulated in the message header, and received data sent by the target device is encapsulated in the message body.

Whether it is the first time to send data to the first target device is determined; if yes, a first message sending thread corresponding to the first target device is created; and if not, an existing first message sending thread is used. Whether it is the first time to receive the information sent by the first target device is determined; if yes, a first message receiving thread is created; and if not, an existing first message receiving thread is used.

Respective communication threads are created for a plurality of target devices. The communication threads are used for receiving and sending information, and receiving and sending a variety of control commands, feedback information, etc. The IB interface may include, but is not limited to, IB VERBS, Sockets Direct Protocol (SDP), and Internet Protocol over InfiniBand (IPoIB). For example, by directly calling an IB VERBS interface or drive, and directly sending a control instruction to the IB VERBS interface or drive during IB transmission, information can be transmitted by means of RDMA.

Whether a first communication thread corresponding to the first target device is created is determined; if yes, the first communication thread is directly used for information sending and reception; and if not, a first communication thread is created. When creating a communication thread, a rank number (identification number) is allocated to each communication thread. The rank number is used for identifying the communication thread. For example, the first communication thread establishes, by calling an IB interface, a connection with the first target device by means of a socket, and exchanges RDMA communication environment information, such as information of the buffer address and quantity, by means of the established socket connection, and information transmission is performed by means of RDMA mechanism. The first communication thread receives feedback information, such as data sending success or failure, from the first target device, and passes the feedback information to the first information sending thread.

The first communication thread receives, by calling the IB interface, information sent by the first target device, and passes an information receiving message corresponding to the first target device to a first message receiving thread corresponding to the first target device. The first message receiving thread processes the information receiving message. For example, the first message receiving thread extracts data from the information receiving message and writes the data to a database. After processing the information receiving message, the first message receiving thread passes feedback information to the first communication thread for the first communication thread to send to the target device.

In the communication method in the foregoing embodiment, corresponding communication thread, message sending thread, and message receiving thread are established for the target device. The communication thread is used for performing data communication by calling an IB interface, and the message sending thread and the message receiving thread can implement asynchronous operations for information sending and reception. Thus, the data transmission efficiency can be improved and bandwidth can be effectively utilized.

In one embodiment, when receiving an information sending message, the first message sending thread determines whether the first communication thread is transmitting data, if yes, puts the information sending message in a task pool, and if not, passes the information sending message to the first communication thread. When receiving data sent by the first target device, the first communication thread determines whether the first message receiving thread is processing information, if yes, puts the information receiving message in the task pool, and if not, passes the information receiving message to the first message receiving thread.

When data reception and sending are concurrently performed for a plurality of target devices by means of multithreading, a task pool is used for caching and scheduling. The task pool is a global task pool and is used for caching information sending messages and information receiving messages corresponding to all the target devices. The task pool may be an array/linked list structure, and by means of locking operations on key steps, achieves thread security under multi-threading and prevents dirty data from being read and written. Receiving and sending operations that cannot be immediately performed can be put in the pool for caching.

A global task processing thread is started to poll the task pool for all the target devices. When determining that an information sending message corresponding to one target device is cached in the task pool, the global task processing thread determines whether a communication thread corresponding to the target device is idle, and if yes, takes out the information sending message corresponding to the target device from the task pool and sends the information sending message to the communication thread corresponding to the target device.

When determining that an information receiving message corresponding to one target device is cached in the task pool, the global task processing thread determines whether a message receiving thread corresponding to the target device is idle, and if yes, takes out the information receiving message corresponding to the target device from the task pool and sends the information receiving message to the message receiving thread corresponding to the target device. The global task processing thread may obtain information of the message receiving thread and the communication thread by parsing the message headers of the information receiving message and the information sending message.

The following is an example to illustrate the information sending message and the information receiving message of the first target device by using the task pool. FIG. 2 is a flowchart for information sending message processing of an embodiment of the communication method according to the present disclosure. As shown in FIG. 2:

Step 201, a first message sending thread receives an information sending message for a first target device.

Step 202, whether a first communication thread is transmitting data is determined; if yes, the process proceeds to step 203; and if not, the process proceeds to step 204.

Step 203, the first message sending thread puts the information sending message in a task pool. The process proceeds to step 205.

Step 204, the first message sending thread sends the information sending message to the first communication thread corresponding to the first target device. The process proceeds to step 207.

Step 205, a global task processing thread determines whether the first communication thread finishes transmitting data (or a control command), i.e., whether the first communication thread is in an idle state; if yes, the process proceeds to step 206; and if not, the process proceeds to step 205 again.

Step 206, the global task processing thread takes out the information sending message from the task pool, and sends the information sending message to the first communication thread.

Step 207, the first communication thread sends data to the first target device according to the information sending message.

FIG. 3 is a flowchart for information receiving message processing of an embodiment of the communication method according to the present disclosure. As shown in FIG. 3:

Step 301, a first communication thread receives data sent by a first target device, and generates an information receiving message.

Step 302, whether a first message receiving thread is processing data (or a control command) is determined; if yes, the process proceeds to step 303; and if not, the process proceeds to step 304.

Step 303, the first communication thread puts the information receiving message in a task pool. The process proceeds to step 305.

Step 304, the first communication thread sends the information receiving message to the first message receiving thread corresponding to the first target device. The process proceeds to step 307.

Step 305, a global task processing thread determines whether the first message receiving thread finishes processing data, i.e., whether the first message receiving thread is in an idle state; if yes, the process proceeds to step 306; and if not, the process proceeds to step 305 again.

Step 306, the global task processing thread takes out the information receiving message from the task pool, and sends the information receiving message to the first message receiving thread. The process proceeds to step 307.

Step 307, the first message receiving thread processes the information receiving message.

Identification bits may be set for all information sending messages and information receiving messages for identifying the states and results of data sending and receiving operations, and can be set according to specific needs. For example, identification bits corresponding to information sending messages and information receiving messages may be set to identify the processing states of the information sending messages and the information receiving messages, for example, 0—initial, 1—success, and −1—failure.

Message sending threads and message receiving threads assign values to the identification bits according to received feedback information. By means of a locking mechanism, each identification bit may be transferred from one state to another state by only one thread, and it would not be possible for another thread to transfer the identification bit from the state to another different state. Identification bit query may be provided, and a user can obtain the operation result without calling a function, thereby reducing waste of resources and time caused by function calling return, and facilitating setting the time sequence during asynchronous transmission.

For example, the first message sending thread receives feedback information corresponding to the sent data and sent by the first communication thread, and assigns a value to the state identification bit of the information sending message according to the feedback information. The first message receiving thread assigns a value to the state identification bit of the information receiving message according to a processing result of the information receiving message. Information sending and reception results can be determined according to the identification bits, and next transmission is initiated when the identification bit turns to transmission success.

The global task processing thread takes out the information sending message and the information receiving message corresponding to the first target device from the task pool, and respectively sends the information sending message and the information receiving message to the first communication thread and the first message receiving thread for processing. Whether the state identification bit of the information sending message and/or the information receiving message corresponding to the first target device taken out of the task pool is success is determined; if yes, the global task processing thread takes out the next information sending message and the next information receiving message corresponding to the first target device from the task pool on the basis of the order in which the information sending message and the information receiving message enter the task pool, and sends the next information sending message and the next information receiving message to the first communication thread and the first message receiving thread for processing, and if not, prompts that a processing exception occurs.

In one embodiment, information sent by a first target device is received, where the information includes a check code and a control command, and the control command sent by the first target device is stored in a memory block according to a received storage control command. In the process of storing the control command, a new check code corresponding to the control command is determined according to the control command receiving progress.

Verification comparison is performed on the new check code and the received check code. If the check codes are consistent, the verification succeeds. It is determined that reception of the information from the first target device is completed, and information sending of the first target device is completed, and processing of the control instruction is started. After it is determined that reception of the information from the first target device is completed, data invalidation processing can be performed on the received check code, for example, filling with 0 and setting as a random number. The algorithm for determining the new check code of the control command is the same as the algorithm for the first target device to generate the check code, for example, a Redundancy Check Code (CRC) 32 algorithm may be adopted to calculate the new check code of the control command.

Verifying the control command and determining whether information sending is completed according to the check code in the received information are not limited by implementation logic of an underlying library, and can reduce the processing procedures, thereby improving the operation efficiency and speed. It is verified through actual tests that using such verification mode when receiving information brings higher stability and higher speed.

In one embodiment, when polling a queried operation exception event by means of an IB interface, whether an exception processing function corresponding to the exception event is registered is determined. For example, whether a pointer of an exception processing function instance can be obtained is determined; if yes, it is determined that an exception processing function corresponding to the exception event is registered; and if not, it is determined that no exception processing function corresponding to the exception event is registered. If it is determined that an exception processing function corresponding to the exception event is registered, the exception processing function is automatically called back to process the exception.

No matter whether an exception processing function corresponding to an exception event is registered, exception processing will be performed on the exception event. For example, when transmission exceptions occur, the transmission exceptions include not only various exceptions occurring when an IB interface function is called but also exceptions occurring to a scheduling thread and deadlocks of the task pool; and corresponding processing will be performed on the various transmission exceptions, including command data retransmission, link termination and disconnection, and thread stop and cleanup, etc. For example, when a severe transmission error occurs, the communication thread is stopped and the connection is interrupted, and if there is a new sending task when the connection is interrupted, a connection is reestablished and the communication thread is started.

A callback function may also be provided for an event. A callback function is a function called by means of a function pointer. There are basic processing functions for most events. If the registered callback function is not empty, a callback function defined and registered by a user will be called back when a corresponding event occurs, so that the user can conveniently follow up an event of interest, and add corresponding operations. For example, if a callback function for control command reception is set, when it is determined that the event is a control command receiving event, the corresponding callback function for control command reception will be called to directly process the received control command event.

In one embodiment, a plurality of implementation modes may be designed for the communication method of the present disclosure. As shown in FIG. 4, a multi-layer structure design may be adopted. A COMMON layer is encapsulated on the underlying IB VERBS interface function layer, and a SIMA main communication layer is encapsulated on the COMMON layer. A user can select the SIMA main communication layer or only use the COMMON layer to perform some personalized customization on the operation functions according to needs. The COMMON layer encapsulates IB VERBS interface functions and provides some basic event processing logic and exception processing logic. The COMMON layer may be directly used for RDMA operations.

Callback functions are provided in the COMMON layer. The COMMON layer provides corresponding operation error function pointer storage locations for storing function pointers to be executed when IB operation errors occur. The pointers are registered by error callback processing functions (i.e., pointing to the functions) of SIMA main communication in the SIMA main communication layer. According to data sending and reception results obtained by the IB VERBS interface function, the COMMON layer provides locations used for storing user-defined function pointers while providing basic processing functions. When detecting that these locations are not empty, the COMMON layer will call these user-defined functions first when these events occur and then perform basic processing.

The SIMA main communication layer may be compatible with startup modes of an MPI and can run under a mainstream platform and cluster management software. The SIMA main communication layer does not perform a retry operation when the sending fails, but performs processing through a callback function, or directly gives feedback to a caller so that the caller decides whether to perform resending. Both data sending and data receiving are performed asynchronously, which does not block the call.

In the communication method provided by the foregoing embodiment, an IB VERBS interface or drive is directly used in the underlying layer, data sending and reception of a target device is performed by means of a multi-threading asynchronous operation, and data receiving and sending operations of unequal number can be supported. Thus, data transmission speed can be improved and bandwidth can be effectively utilized.

In one embodiment, as shown in FIG. 5, the present disclosure provides a communication system 50, including: a thread configuration module 51, a data communication module 52, a processing state setting module 53, and an information verification module 54.

The thread configuration module 51 separately creates a corresponding thread for at least one of a plurality of target devices, where the created thread corresponding to the target device includes a communication thread and a message processing thread, and the message processing thread includes a message sending thread and/or a message receiving thread. The data communication module 52 communicates with a corresponding target device on the basis of the corresponding created thread.

A first message sending thread sends an information sending message to a first communication thread, and the first communication thread sends information to a first target device on the basis of the information sending message by calling an IB interface. The first communication thread receives, by calling the IB interface, information sent by the first target device, generates an information receiving message corresponding to the received information, and sends the information receiving message to a first message receiving thread. The first target device is one of the plurality of target devices, and the first communication thread, the first message sending thread, and the first message receiving thread are a communication thread, a message sending thread, and a message receiving thread corresponding to the first target device, respectively.

The first message sending thread puts the information sending message to be sent to the first communication thread in a task pool in response to determining that the first communication thread is currently in a busy state. The first communication thread puts the information receiving message to be sent to the first message receiving thread in the task pool in response to determining that the first message receiving thread is currently in a busy state. The task pool is configured to cache information sending messages and/or information receiving messages corresponding to the plurality of target devices.

The thread configuration module 51 creates a global task processing thread corresponding to the plurality of target devices. The global task processing thread takes out the information sending message from the task pool and sends the information sending message to the first communication thread in response to determining that the first communication thread is currently in an idle state. The global task processing thread takes out the information receiving message from the task pool and sends the information receiving message to the first message receiving thread in response to determining that the first message receiving thread is currently in an idle state.

The processing state setting module 53 sets a state identification bit corresponding to the information sending message, and sets a state identification bit corresponding to the information receiving message. The first message sending thread receives feedback information corresponding to the sent information and sent by the first communication thread, and assigns a value to the state identification bit of the information sending message according to the feedback information. The first message receiving thread assigns a value to the state identification bit of the information receiving message according to a processing result of the information receiving message.

In response to the state identification bit of the information sending message and/or the information receiving message corresponding to the first target device taken out of the task pool being success, the global task processing thread takes out the next information sending message and/or the next information receiving message corresponding to the first target device from the task pool on the basis of the order in which the information sending message and/or the information receiving message enters the task pool, and sends the next information sending message and/or the next information receiving message to the first communication thread and/or the first message receiving thread.

In response to the received information (including a check code and a control command, for example), the information verification module 54 determines a new check code according to the control command receiving progress of a memory block used for storing the control command, performs verification comparison on the new check code and the received check code, and determines that reception of the information from the first target device is completed when the verification succeeds. The information verification module 54 performs data invalidation processing on the received check code in response to determining that reception of the information from the first target device is completed.

The thread configuration module 51 creates the first message sending thread in response to determining that the current information sending is the first information sending to the first target device, creates the first communication thread in response to determining that the first communication thread corresponding to the first target device is not created currently, and creates the first message receiving thread in response to determining that the current information reception is the first reception of information sent by the first target device. If an operation exception event is received by means of the IB interface, the first communication thread calls back an exception processing function corresponding to the exception event in response to determining that the exception processing function is registered.

An embodiment of the present disclosure also provides an electronic device which, for example, may be a mobile terminal, a Personal Computer (PC), a tablet computer, a server, and the like. Referring to FIG. 6 below, a schematic structural diagram of an electronic device 600, which may be a terminal device or a server, suitable for implementing an embodiment of the present disclosure is shown. As shown in FIG. 6, the computer device 600 includes one or more processors, a communication part, and the like. The one or more processors are, for example, one or more Central Processing Units (CPUs) 601 and/or one or more Graphic Processing Units (GPUs) 613, and may execute appropriate actions and processing according to executable instructions stored in a Read-Only Memory (ROM) 602 or executable instructions loaded from a storage section 608 to a Random Access Memory (RAM) 603. The communication part 612 may include, but is not limited to, a network card. The network card may include, but is not limited to, an IB network card.

The processor may communicate with the ROM 602 and/or the RAM 603 to execute executable instructions, is connected to the communication part 612 by means of a bus 604, and communicates with other target devices by means of the communication part 612, so as to complete corresponding operations of any of the communication methods provided by the embodiments of the present disclosure, for example, an instruction for separately creating a corresponding thread for each of a plurality of target devices, where the created thread corresponding to any of the target devices includes a communication thread and a message processing thread, and the message processing thread includes a message sending thread and/or a message receiving thread, and an instruction for communicating with a corresponding target device on the basis of the corresponding configured thread. A communication process with a first target device includes: sending, by a first message sending thread, an information sending message to a first communication thread, and sending, by the first communication thread, data to the first target device on the basis of the information sending message by calling an IB interface; and/or receiving, by the first communication thread by calling the IB interface, data sent by the first target device, generating an information receiving message corresponding to the received data, and sending the information receiving message to a first message receiving thread; where the first target device is one of the plurality of target devices, and the first communication thread, the first message sending thread, and the first message receiving thread are a communication thread, a message sending thread, and a message receiving thread corresponding to the first target device, respectively.

In addition, the RAM 603 may further store various programs and data required for operations of an apparatus. The CPU 601, the ROM 602, and the RAM 603 are connected to each other by means of the bus 604. In the presence of the RAM 603, the ROM 602 is an optional module. The RAM 603 stores executable instructions, or writes the executable instructions into the ROM 602 during running, where the executable instructions cause the processor 601 to execute corresponding operations of the foregoing communication method. An Input/Output (I/O) interface 605 is also connected to the bus 604. The communication part 612 may be integrated, or may be configured to have a plurality of sub-modules (for example, a plurality of IB network cards) connected to the bus.

The following components are connected to the I/O interface 605: an input section 606 including a keyboard, a mouse and the like; an output section 607 including a Cathode-Ray Tube (CRT), a Liquid Crystal Display (LCD), a loudspeaker and the like; the storage section 608 including a hard disk and the like; and a communication section 609 of a network interface card including an LAN card, a modem and the like. The communication section 609 performs communication processing via a network such as the Internet. A drive 610 is also connected to the I/O interface 605 according to requirements. A removable medium 611 such as a magnetic disk, an optical disk, a magneto-optical disk, a semiconductor memory or the like is mounted on the drive 610 according to requirements, so that a computer program read from the removable medium may be installed on the storage section 608 according to requirements.

It should be noted that the architecture illustrated in FIG. 6 is merely an optional implementation mode. During specific practice, the number and types of the components in FIG. 6 may be selected, decreased, increased, or replaced according to actual requirements. Different functional components may be separated or integrated or the like. For example, the GPU and the CPU may be separated, or the GPU may be integrated on the CPU, and the communication part may be separated from or integrated on the CPU or the GPU or the like. These alternative implementations all fall within the scope of protection of the present disclosure.

Particularly, the process described above with reference to the flowchart according to an embodiment of the present disclosure may be implemented as a computer software program. For example, an embodiment of the present disclosure includes a computer program product, including a computer program tangibly included in a machine-readable medium. The computer program includes a program code for executing a method shown in the flowchart. The program code may include corresponding instructions for correspondingly executing steps of the communication method provided by an embodiment of the present disclosure, for example, an instruction for receiving an information sending message for a target device, an instruction for passing the information sending message to a sending thread corresponding to the target device, and an instruction for the sending thread to pass sent data to an underlying communication thread corresponding to the target device according to the information sending message, where the underlying communication thread sends the data to the target device by calling an IB interface and passes feedback information to the sending thread. In such an embodiment, the computer program may be downloaded and installed from the network through the communication part 612, and/or is installed from the removable medium 611. The computer program, when being executed by the CPU 601, executes the foregoing functions defined in the method of the present disclosure.

An embodiment of the present disclosure also provides a computer cluster. As shown in FIG. 7, the computer cluster includes: an IB switch 71 and a plurality of said electronic devices 72, 73, 74, ..., 75, 76, 77. The IB switch 71 and the plurality of electronic devices 72, 73, 74, ..., 75, 76, 77 may be connected through buses, network cables, and the like. Each of the electronic devices is provided with a communication part (which is an IB network card, for example). The communication part of each of the electronic devices communicates with other electronic devices through the IB switch 71.

According to the communication methods and systems, the electronic devices, and the computer clusters provided by the foregoing embodiments, a multi-threading mode is adopted for data sending and reception of a target device, data reception and sending are performed asynchronously, identification bits are provided to identify results or states of operations, and data receiving and sending operations of unequal number are supported. Thus, data transmission speed can be improved and bandwidth can be effectively utilized. A hierarchical structure design is adopted, data is transmitting through RDMA by calling an IB interface or drive, and customized callback support is provided, so that users can define operations by themselves conveniently to complete special functions, and communication and calculation are combined more efficiently.

The methods, apparatuses, and devices in the present disclosure may be implemented in many manners. For example, the methods, apparatuses, and devices in the present disclosure may be implemented with software, hardware, firmware, or any combination of software, hardware, and firmware. The foregoing sequence of steps of the method is merely for description, and unless otherwise stated particularly, is not intended to limit the steps of the method in the present disclosure. In addition, in some embodiments, the present disclosure may alternatively be implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual disclosure of the present disclosure, and to enable a person of ordinary skill in the art to understand the present disclosure, so as to design various embodiments with various modifications applicable to particular use.

The invention claimed is:

1. A communication method, comprising:
creating a corresponding thread for at least one of a plurality of target devices, wherein the created thread corresponding to the target device comprises a communication thread and a message processing thread, and the message processing thread comprises at least one of a message sending thread or a message receiving thread; and
communicating with a corresponding target device based on the corresponding created thread, wherein a communication process with a first target device comprises at least one of: sending, by a first message sending thread, an information sending message to a first communication thread, and sending, by the first communication thread, information to the first target device on the basis of the information sending message by calling an Infiniband (IB) interface; or receiving, by the first communication thread by calling the IB interface, information sent by the first target device, generating an information receiving message corresponding to the received information, and sending the information receiving message to a first message receiving thread;
the first target device is one of the plurality of target devices, and the first communication thread, the first message sending thread, and the first message receiving thread are a communication thread, a message sending thread, and a message receiving thread corresponding to the first target device, respectively.

2. The method according to claim 1, wherein the communication process with the first target device further comprises at least one of:
putting, by the first message sending thread, the information sending message to be sent to the first communication thread in a task pool in response to determining that the first communication thread is currently in a busy state; or
putting, by the first communication thread, the information receiving message to be sent to the first message receiving thread in the task pool in response to determining that the first message receiving thread is currently in a busy state;
wherein the task pool is configured to cache at least one of information sending messages or information receiving messages to be processed corresponding to the plurality of target devices.

3. The method according to claim 2, further comprising at least one of:
taking out, by a pre-created global task processing thread corresponding to the plurality of target devices, the information sending message corresponding to the first target device from the task pool and sending the information sending message to the first communication thread in response to determining that the first communication thread is currently in an idle state; or
taking out, by the pre-created global task processing thread corresponding to the plurality of target devices, the information receiving message corresponding to the first target device from the task pool and sending the information receiving message to the first message receiving thread in response to determining that the first message receiving thread is currently in an idle state.

4. The method according to claim 3, wherein the communication process with the first target device further comprises at least one of:
setting a state identification bit corresponding to the information sending message;
the first message sending thread receives feedback information corresponding to the sent information and sent by the first communication thread, and assigns a value to the state identification bit of the information sending message according to the feedback information; or
setting a state identification bit corresponding to the information receiving message;
the first message receiving thread assigns a value to the state identification bit of the information receiving message according to a processing result of the information receiving message.

5. The method according to claim 4, wherein the communication process with the first target device further comprises:
taking out, by the global task processing thread in response to the state identification bit of at least one of the information sending message or the information receiving message corresponding to the first target device taken out of the task pool being success, at least one of a next information sending message or a next information receiving message corresponding to the first target device from the task pool based on what order the at least one of the information sending message or the information receiving message enters the task pool, and sending the at least one of the next information sending message or the next information receiving message to at least one of the first communication thread or the first message receiving thread.

6. The method according to any one of claim 1, wherein the communication process with the first target device further comprises:
determining, in response to the received information comprising a first check code and a control command, a new check code according to the control command receiving progress of a memory block used for storing the control command, performing verification comparison on the new check code and the first check code, and determining that reception of the information from the first target device is completed when the verification succeeds.

7. The method according to claim 6, wherein the communication process with the first target device further comprises:
performing data invalidation processing on the first check code in response to determining that reception of the information from the first target device is completed.

8. The method according to claim 1, wherein the creating a corresponding thread for the first target device comprises at least one of:

creating the first message sending thread in response to determining that current information sending is the first information sending to the first target device;
creating the first communication thread in response to determining that the first communication thread corresponding to the first target device is not created currently; or
creating the first message receiving thread in response to determining that current information reception is the first reception of information sent by the first target device.

9. The method according to claim 1, further comprising:
if an operation exception event is received by means of the IB interface, calling back, by the first communication thread, an exception processing function corresponding to the operation exception event in response to determining that the exception processing function is registered.

10. The method according to claim 1, wherein
the IB interface comprises an IB VERBS interface.

11. A communication system, comprising:
at least one processor; and
a memory storing instructions, the instructions when executed by the at least one processor, cause the at least one processor to perform operations, the operations comprising: creating a corresponding thread for at least one of a plurality of target devices, wherein the created thread corresponding to the target device comprises a communication thread and a message processing thread, and the message processing thread comprises at least one of a message sending thread or a message receiving thread; and
communicating with a corresponding target device based on the corresponding created thread;
wherein a communication process with a first target device comprises at least one of: a first message sending thread sends an information sending message to a first communication thread, and the first communication thread sends information to a first target device on the basis of the information sending message by calling an IB interface; or the first communication thread receives, by calling the IB interface, information sent by the first target device, generates an information receiving message corresponding to the received information, and sends the information receiving message to a first message receiving thread;
the first target device is one of the plurality of target devices, and the first communication thread, the first message sending thread, and the first message receiving thread are a communication thread, a message sending thread, and a message receiving thread corresponding to the first target device, respectively.

12. The system according to claim 11, wherein the communication process with the first target device further comprises at least one of: the first message sending thread puts the information sending message to be sent to the first communication thread in a task pool in response to determining that the first communication thread is currently in a busy state; or
the first communication thread puts the information receiving message to be sent to the first message receiving thread in the task pool in response to determining that the first message receiving thread is currently in a busy state;
wherein the task pool is configured to cache at least one of information sending messages or information receiving messages to be processed corresponding to the plurality of target devices.

13. The system according to claim 12, wherein
the creating a corresponding thread for at least one of a plurality of target devices further comprises creating a global task processing thread corresponding to the plurality of target devices; wherein the operations further comprises at least one of: the global task processing thread takes out the information sending message corresponding to the first target device from the task pool and sends the information sending message to the first communication thread in response to determining that the first communication thread is currently in an idle state; or the global task processing thread takes out the information receiving message corresponding to the first target device from the task pool and sends the information receiving message to the first message receiving thread in response to determining that the first message receiving thread is currently in an idle state.

14. The system according to claim 11, wherein the operations further comprise:
determining, in response to the received information comprising a check code and a control command, a new check code according to the control command receiving progress of a memory block used for storing the control command, perform verification comparison on the new check code and the first check code, and determine that reception of the information from the first target device is completed when the verification succeeds.

15. The system according to claim 14, wherein the communication process with the first target device further comprises:
performing data invalidation processing on the first check code in response to determining that reception of the information from the first target device is completed.

16. The system according to claim 11, wherein the creating a corresponding thread for the first target device comprises at least one of:
creating the first message sending thread in response to determining that current information sending is the first information sending to the first target device; or creating the first communication thread in response to determining that the first communication thread corresponding to the first target device is not created currently; and/or create the first message receiving thread in response to determining that current information reception is the first reception of information sent by the first target device.

17. The system according to claim 11, wherein
if an operation exception event is received by means of the IB interface, the first communication thread calls back an exception processing function corresponding to the exception event in response to determining that the exception processing function is registered.

18. An electronic device, comprising: a processor, a memory, an IB communication part, and a communication bus, wherein the processor, the memory, and the communication part communicate with one another by means of the communication bus; and
the memory is configured to store at least one executable instruction, and the executable instruction causes the processor to execute corresponding operations, the operations comprise:

creating a corresponding thread for at least one of a plurality of target devices, wherein the created thread corresponding to the target device comprises a communication thread and a message processing thread, and the message processing thread comprises at least one of a message sending thread or a message receiving thread; and communicating with a corresponding target device based on the corresponding created thread, wherein a communication process with a first target device comprises at least one of: sending, by a first message sending thread, an information sending message to a first communication thread, and sending, by the first communication thread, information to the first target device based on the information sending message by calling an Infiniband (IB) interface;

or receiving, by the first communication thread by calling the IB interface, information sent by the first target device, generating an information receiving message corresponding to the received information, and sending the information receiving message to a first message receiving thread;

the first target device is one of the plurality of target devices, and the first communication thread, the first message sending thread, and the first message receiving thread are a communication thread, a message sending thread, and a message receiving thread corresponding to the first target device, respectively.

19. The electronic device according to claim 18, wherein the communication process with the first target device further comprises at least one of:

putting, by the first message sending thread, the information sending message to be sent to the first communication thread in a task pool in response to determining that the first communication thread is currently in a busy state; or putting, by the first communication thread, the information receiving message to be sent to the first message receiving thread in the task pool in response to determining that the first message receiving thread is currently in a busy state;

wherein the task pool is configured to cache at least one of information sending messages or information receiving messages to be processed corresponding to the plurality of target devices.

20. A non-transitory computer readable storage medium storing a computer program, wherein the computer program, when executed by a processor, causes the processor to perform operations of the communication method according to claim 1.

* * * * *